United States Patent [19]
Richelmann

[11] 3,805,159
[45] Apr. 16, 1974

[54] CONTACTOR UNIT FOR INTEGRATED CIRCUIT TESTING

[75] Inventor: Bernd H. Richelmann, San Diego, Calif.

[73] Assignee: Delta Design, Inc., La Mesa, Calif.

[22] Filed: Nov. 22, 1971

[21] Appl. No.: 201,231

Related U.S. Application Data
[63] Continuation of Ser. No. 855,582, Sept. 15, 1969, abandoned.

[52] U.S. Cl.......... 324/158 F, 339/74 R, 339/193 R
[51] Int. Cl....................... H01r 13/62, H01r 13/50
[58] Field of Search......... 324/158 F, 158 P, 158 R; 339/193, 193 S, 193 VS, 17 C, 17 CF, 174, 176, 74, 75 M, 193 P

[56] References Cited
UNITED STATES PATENTS

| 3,408,565 | 10/1968 | Frick et al. | 324/158 R |
| 3,414,869 | 12/1968 | Pascua | 339/193 |
| 2,981,919 | 4/1961 | Lamont et al. | 339/75 M |
| 3,225,324 | 12/1965 | Comfort | 339/75 M |

FOREIGN PATENTS OR APPLICATIONS
876,357  8/1961  Great Britain ....................... 339/74

OTHER PUBLICATIONS
Gustafson, R. M.; Low–Stress Connector; IBM Tech. Dis. Bull.; April 1968; pg. 1656.

*Primary Examiner*—Alfred E. Smith
*Assistant Examiner*—Ernest F. Karlsen
*Attorney, Agent, or Firm*—Brown & Martin

[57] ABSTRACT

A contactor unit for making simultaneous contact with all connection leads of an integrated circuit component, particularly while in a test fixture such as an environmental chamber. Individual spring type contacts are biased to make contact with the leads and are normally held in retracted position by a spring loaded plunger. When an integrated circuit component is mounted in a special carrier and pressed against the plunger, the contacts extend to make the connections.

8 Claims, 12 Drawing Figures

INVENTOR.
BERND H. RICHELMANN
BY
ATTORNEY

INVENTOR.
BERND H. RICHELMANN

PATENTED APR 16 1974 3,805,159

INVENTOR.
BERND H. RICHELMANN
BY Carl R. Brown
ATTORNEY

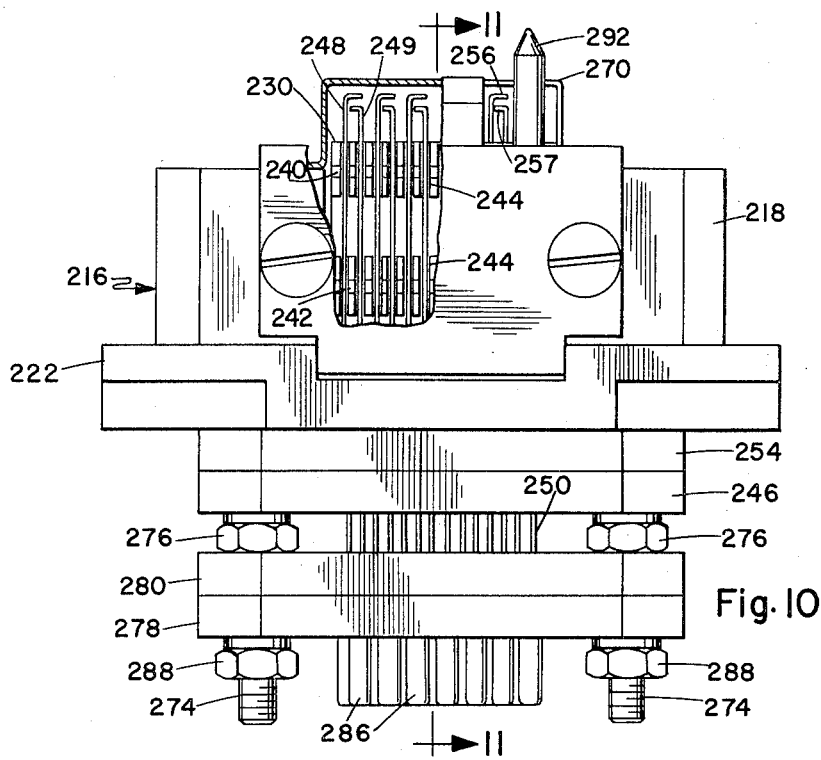
Fig. 10
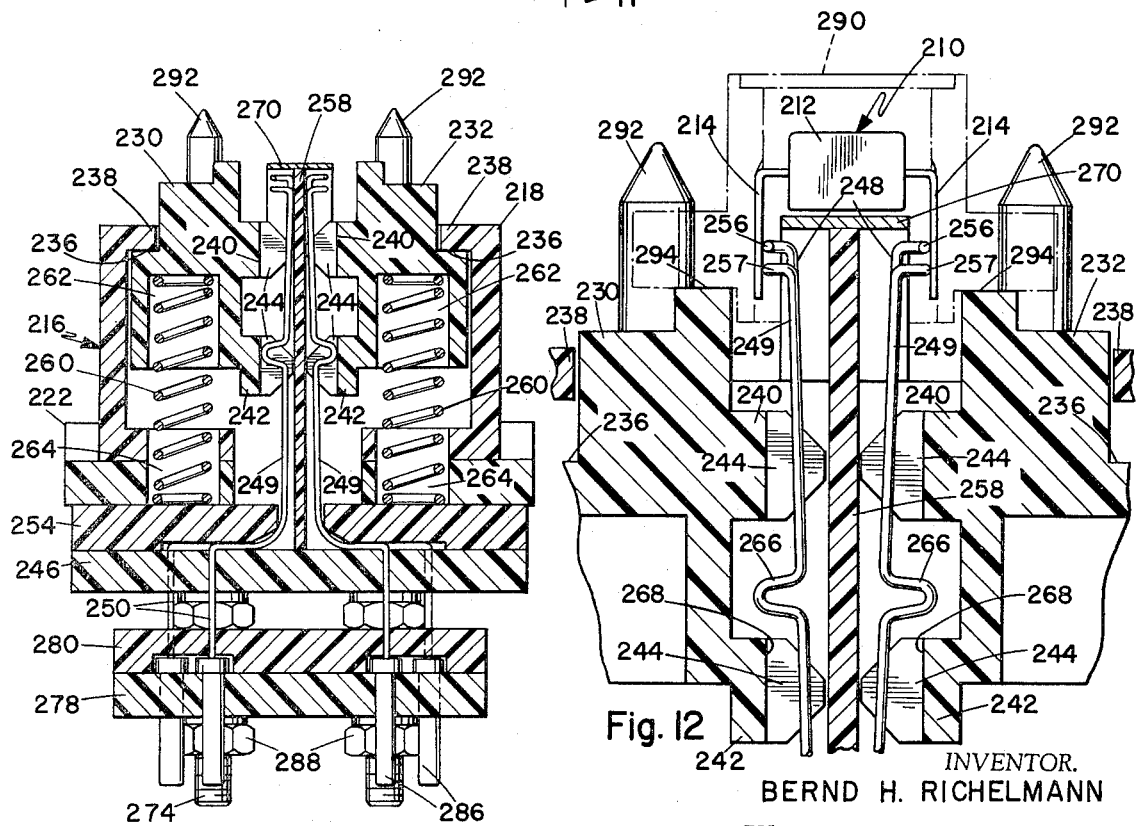
Fig. 11
Fig. 12
INVENTOR.
BERND H. RICHELMANN
BY
ATTORNEY

CONTACTOR UNIT FOR INTEGRATED CIRCUIT TESTING

REFERENCE TO RELATED APPLICATION

This is a continuation of application Ser. No. 855,582, filed Sept. 15, 1969, now abandoned.

BACKGROUND OF THE INVENTION

In testing packaged integrated circuit components with grouped connecting leads, it is usually necessary to make contact with all or most of the leads simultaneously for complete circuit checking. Due to the small size of such components and the proximity of the leads, the contacts must be precisely positioned and carefully applied to avoid damaging the components. When testing is carried out in an environmental chamber, the contacting operation must be performed remotely or automatically. Apparatus which has been developed for the purpose normally uses mechanically driven contacts which can damage the leads or the components by excess pressure, and the actuating mechanism may be affected by severe environment conditions in some testing.

SUMMARY OF THE INVENTION

The contactor units described herein each have spring type contact fingers which make contact with the components leads only by their own spring pressure, which avoids damage from excess pressure. The contact fingers are held in retracted position by a spring loaded plunger, which also holds and guides the fingers in precise alignment in individual slots, the fingers being enclosed and protected from damage or misalignment in retracted position. A component to be tested is mounted in a carrier which is pressed against the plunger, causing the plunger to be depressed and allowing the fingers to extend into contact with the component leads. No complex mechanism is involved and the unit is easily made to withstand severe environmental conditions. The units are adaptable to a variety of components with long or short leads and are compatible with standard component carriers.

Other objects of this invention will become more apparent upon a reading of the following detailed specification and an examination of the drawings wherein like reference numerals designate like parts throughout and in which:

FIG. 10 is a side elevation view of a further form of the unit.

FIG. 11 is a sectional view taken on line 11—11 of FIG. 10.

FIG. 12 is an enlarged sectional view, similar to a portion of FIG. 11, showing the contact finger action.

DESCRIPTION OF THE PREFERRED EMBODIMENTS

Figure 1:
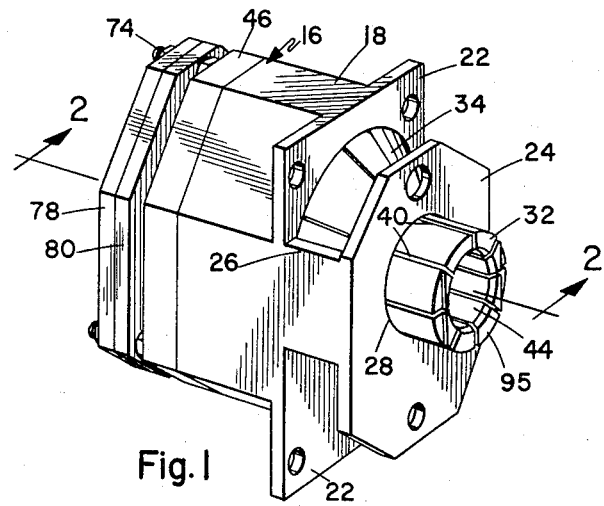
FIG. 1 is a perspective view of one form of the unit.
Figure 2:
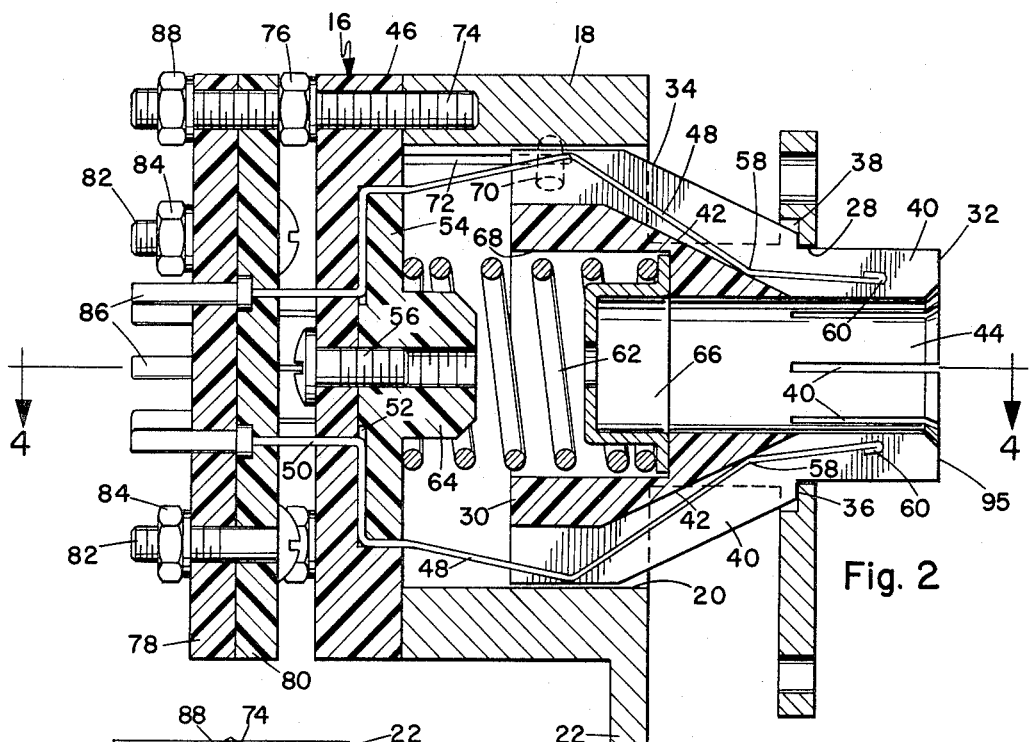
FIG. 2 is an enlarged sectional view taken on line 2—2 of FIG. 1.
Figure 3:
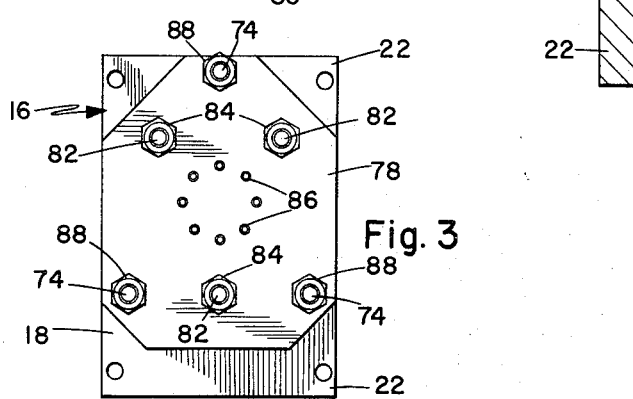
FIG. 3 is a rear elevation view as taken from the left end of FIG. 1.
Figure 4:
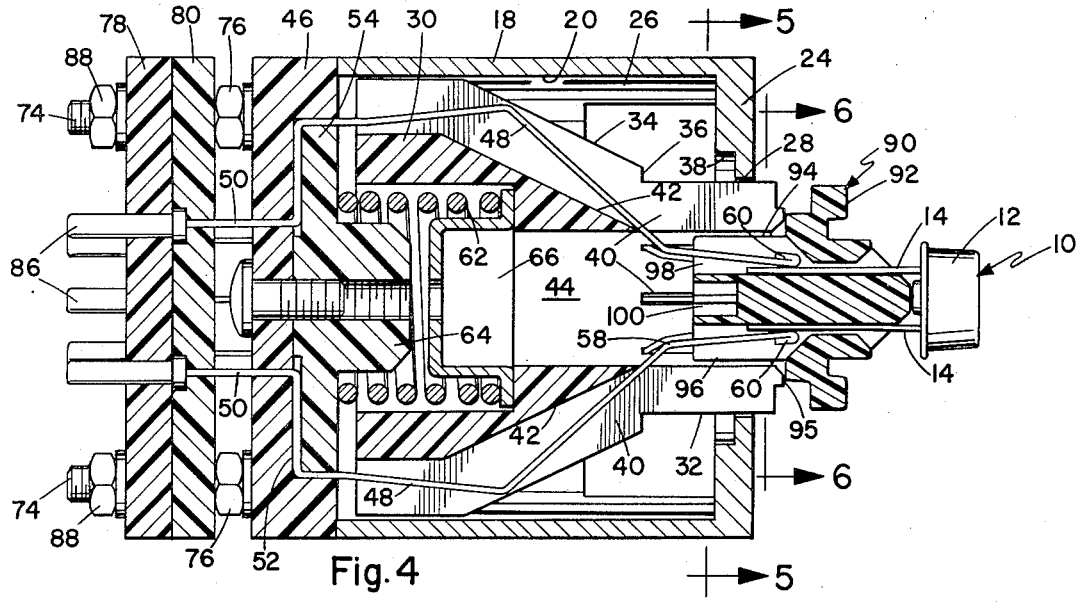
FIG. 4 is a sectional view taken on line 4—4 of FIG. 2.
Figure 5:
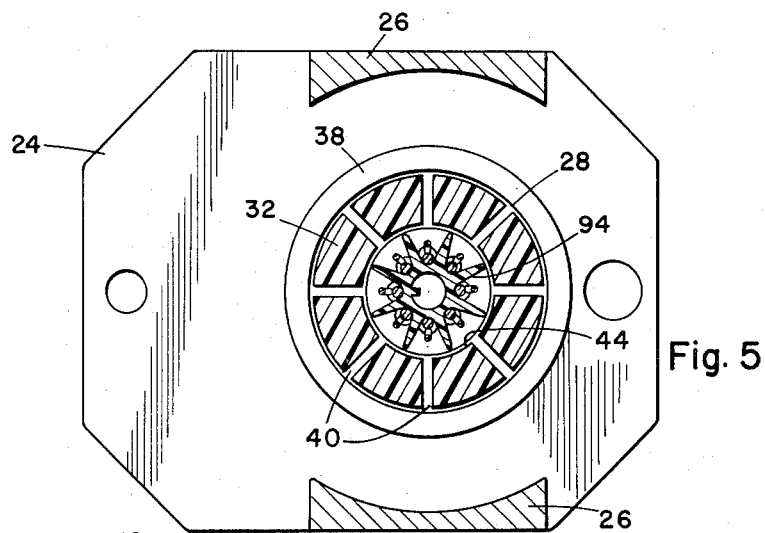
FIG. 5 is a sectional view taken on line 5—5 of FIG. 4.

The unit shown in FIGS. 1 through 6 is designed for testing TO-5 and similar transistor case type components, such as the component 10 in FIG. 4, which has a cylindrical case 12 and extended leads 14. There are many different components of this configuration in present use with various numbers of leads, the unit being shown is an eight lead arrangement but being readily adaptable to any required number.

The contactor unit 16 has a housing 18 with a large cylindrical bore 20 and external mounting flanges 22, the specific configuration being adapted to requirements of the testing apparatus in which the unit is to be used. Spaced from the forward end of housing 18 is a face plate 24 supported on posts 26 integral with the housing, and in the face plate is a circular opening 28 co-axial with and smaller than bore 20. Slidably mounted in bore 20 is a plunger 30 having a reduced diameter forward sleeve portion 32, which is a close sliding fit through opening 28. The plunger 30 has a conical portion 34 terminating at a stop shoulder 36 at the rear of sleeve portion 32, the stop shoulder seating in a shallow counterbore 38 in the rear of face plate 24 to limit the forward or outward travel of the plunger. Plunger 30 has eight equally spaced radial slots 40 extending the full length to the forward end of sleeve portion 32 and following the straight and tapered configuration of the plunger. In conical portion 34 the base of each slot 40 forms an inclined ramp 42 and at the forward end the slots open into an axial bore or socket 44 through sleeve portion 32.

Fixed to the rear of housing 18 is a contact base 46 in which are secured eight resilient wire contact fingers 48, each finger having a pin portion 50 projecting rearwardly through the base. The fingers 48 extend radially in a recess 52 in base 46 and are held in place by a retainer 54 secured in the recess by a clamp screw 56. Each finger 48 extends forwardly through one of the slots 40 and has an inwardly bent bight portion 58 which rests on ramp 42, the contact tip 60 of the finger extending along sleeve portion 32. In the forward position of plunger 30, as in FIG. 2, the ramps 42 hold the fingers 48 in outwardly retracted position, fully enclosed within the slots 40. Plunger 30 is biased forwardly by a load spring 62 held at one end on a boss 64 integral with retainer 54 and at the other end by a cup 66 recessed in a counterbore 68 in the rear of the plunger. The plunger is held against rotation by a guide pin 70 which slides in a groove 72 in bore 20.

Contact base 46 is secured to housing 18 by threaded studs 74 and nuts 76, the studs extending rearwardly to support a connector base 78 and a cover 80, which are clamped together by screws 82 and nuts 84 to hold rearwardly projecting connecting pins 88 to which the testing apparatus is connected. Pin portions 50 of the contact fingers are connected to individual connecting pins 86, and the base and cover assembly is held on studs 74 by nuts 88. All portions of the unit which might come in contact with the fingers are of non-conductive material capable of withstanding expected environmental conditions.

The component 10 is held in a carrier 90, which is readily available item. The carrier has a plate portion 92 for attachment to mounting apparatus and a plug 94 which fits into socket 44, with the plate portion resting on the forward end or pressure face 95 of sleeve 32. The plug 94 has radial vanes 96 which form longitudinal channels 98 for the individual leads 14.

Figure 6:
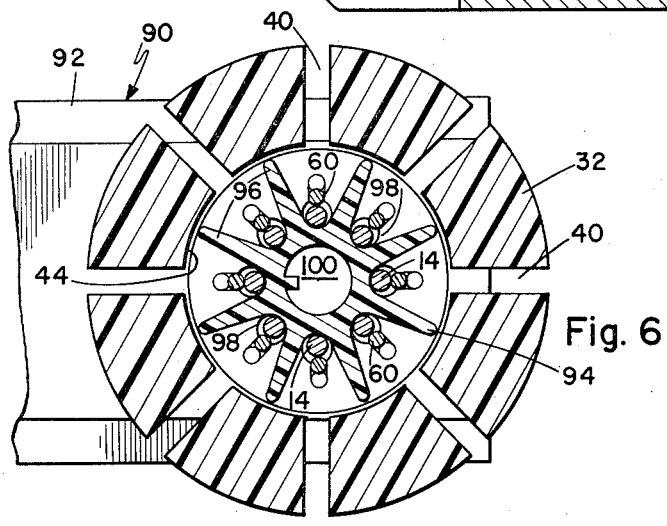
FIG. 6 is an enlarged sectional view taken on line 6—6 of FIG. 4.

With the carrier 90 properly oriented in the testing apparatus, channels 98 are radially inwardly aligned with slots 40, as in FIG. 6. When the carrier 90 is pressed against pressure face 95, the plunger 30 is depressed against spring 62, as in FIG. 4. As the ramps 42 slide rearwardly of bight portions 58, the fingers 48 are free to move inwardly into channels 98 and make electrical contact with leads 14. A slight misalignment of the channels 98 with slots 40 can be tolerated, since the channels tend to guide the fingers to the leads. The fingers are preformed, so that by their own resilience they bear on the leads with sufficient pressure for a good connection. When the pressure on the carrier 90 is released, spring 62 extends the plunger and ramps 42 retract the fingers 48.

As shown the carrier 90 is for a component having short leads. Some components have long leads and a standard vaned extension, not shown, can be plugged into a socket 100 in the rear of the carrier to support the long leads. The depth of socket 44 is ample to accept such an extension.

Figure 7:
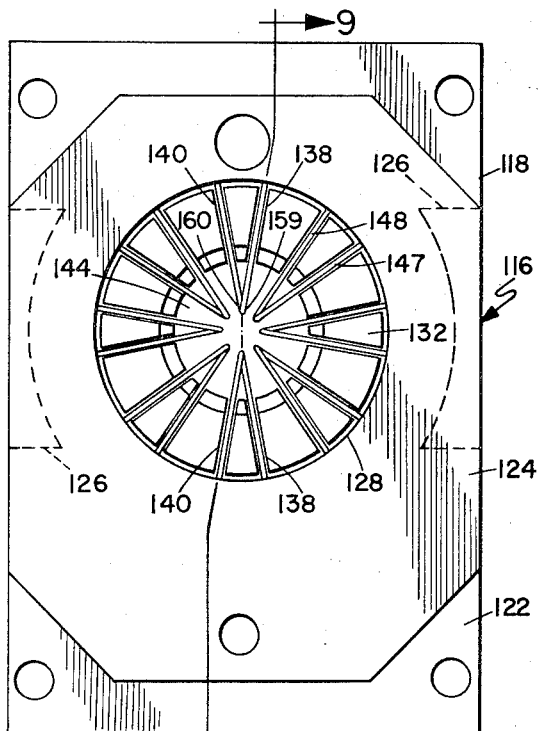
FIG. 7 is a front elevation view of a modified form of the unit with the contact fingers extended.
Figure 8:
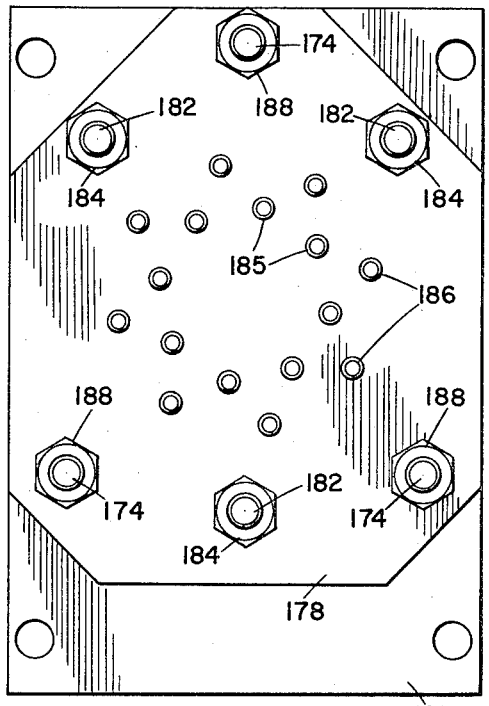
FIG. 8 is a rear elevation view of the unit shown in FIG. 7.
Figure 9:
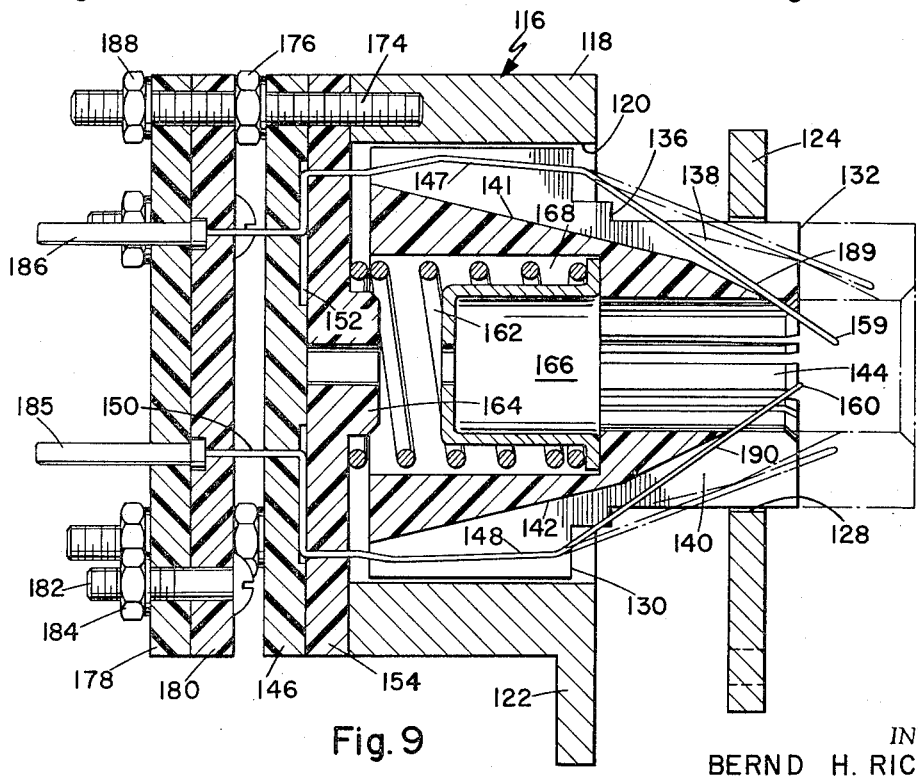
FIG. 9 is a sectional view taken on line 9—9 of FIG. 7.

A modified form of contactor unit 116 is shown in FIGS. 7 through 9, the modified unit having a housing 119 with a bore 120 and mounting flanges 122 and a face plate 124 supported on posts 126, with an opening 128 in the face plate. The arrangement is similar to that of housing 18. The plunger 130 has a sleeve portion 132 with a stop housing 136, but has a double set of slots 138 and 140 arranged in pairs, eight pairs being shown as an example. The base of each slot 138 forms an inclined ramp 141 and the base of each slot 140 forms a ramp 142, the slots opening into the forward end of an axial socket 144 in sleeve portion 132. Fixed to the rear of housing 118 is a contact base 146 in which pairs of resilient wire fingers 147 and 148 are mounted, with pin portions 150 of the fingers projecting rearwardly through the base. The fingers 147 and 148 are set in a recess 152 in base 146 and held by a retainer 154. The fingers of each pair are of slightly different lengths, the contact tip 159 of finger 147 extending further forward than the contact tip 160 of fingers 148. Each pair of fingers converges so that the two contact tips will contact a common component lead at longitudinally spaced positions. Plunger 130 is biased forwardly by a spring 162 held on a boss 164 on the retainer 154 and a cup 166 recessed in a counterbore 168 in the plunger. Contact base 146 is secured to housing 118 by threaded studs 174 and nuts 176.

Mounted on the rearwardly projecting studs 174 is a connector base 178 with a cover 180 which holds in place a double set of connecting pins 185 and 186, connected to the individual contact fingers. Connection base 178 and cover 180 are secured together by screws 182 and nuts 184 and are held on studs 174 by nuts 188.

The action is similar to that of unit 16, the resilient fingers being held retracted in the forward position of the plunger, as indicated in broken line in FIG. 9, and extended as in the full line position in FIGS. 7 and 9, with the plunger depressed. In this instance the fingers are shown as having inwardly offset end portions 189 and 190 which ride on ramps 141 and 142, rather than formed bight portions, either configuration being suitable. It should be noted that one finger of each length, not of the same pair, are shown in FIG. 9, the other fingers being omitted for clarity. The disposition of all the extended fingers in their related pairs is shown in FIG. 7. The dual fingers contacting each lead of a component permit the use of dual wiring or Kelvin type wiring in the associated test equipment, the circuitry being well known. The purpose of the arrangement is to allow the application of a small electrical input to the leads to nullify the electrical resistance and thermal effects which occur. This improves testing accuracy with components whose various electrical values are extremely small.

A further form of the unit, shown in FIGS. 10 through 12, has the same basic action but has a configuration adapted to a dual in-line package or DIP type integrated circuit component, indicated at 210 in FIG. 12. This component has a generally rectangular casing 212, usually molded around the circuitry, with a group of leads 214 extending from each side, the leads being bent into spaced parallel rows for mounting on a circuit board.

The contactor unit 216 has hollow housing 218 with a flanged mounting plate 222. The unit is shown in a vertical position and described in that relation, but may be used in any position. Slidably mounted in housing 218 are two plungers 230 and 232, which could be connected to move as a unit, each plunger having a stop shoulder 236 which engages a flange 238 on housing 218 to limit the upward or outward travel of the plunger. On the inner face of each plunger are two horizontally parallel ribs 240 and 242, each having correspondingly spaced vertical slots 244. Fixed to the lower end of housing 218 is a contact base 246 in which are secured resilient wire fingers 248 and 249 with downwardly extending pin portions 250, the fingers being held in place by a retainer plate 254. The unit is shown with paired fingers for dual or Kelvin type wiring, but could also have a single finger arrangement. Each finger extends upwardly through slots 244, the ribs holding all the fingers in spaced parallel alignment. At the upper end of each finger 248 is a horizontally turned contact 256 and on each finger 249 is a contact tip 257, the tips of each pair of fingers being in opposed overlapping relation and vertically separated. To avoid contact between the two confronting rows of fingers, a non-conductive separation plate 258 is fixed in the housing between the plungers.

Each plunger is extended by a spring 260 seated in a socket 262 in the plunger and a socket 264 in mounting plate 222. Each finger has an outwardly projecting V-shaped bight portion 266 which, in the upper position of the plunger, rides on the outer face 268 of the respective slot 244 in the lower rib 242. The fingers are preformed to spring outwardly, so that when the plungers are depressed, the ribs 242 slide below bight portions 266 and allow the fingers to move outwardly. When the plungers extend the ribs 242 ride up on the bight portions and force the fingers inwardly. The face 268 of each slot 244 thus acts as a ramp but need not be inclined to achieve the action. The upper ends of the fingers are protected by a saddle-like cover 270 secured to housing 218.

The contact base 246 and retainer 254 are held to housing 218 by studs 274 and nuts 276, the studs also holding a connector base 278 and cover 280 in which connecting pins 286 are secured in contact with pin portions 250. Nuts 288 secure the assembly on the studs 274.

The component 210 is held in a standard carrier 290, shown in broken line in FIG. 12, the carrier having means to hold the leads 214 in accurately aligned positions. For precise orientation the housing 218 has upwardly projecting locating pins 292, which engage in standardized slots or notches provided in the carrier. When the carrier 290 is pressed against the pressure faces 294 of plungers 230 and 232, the plungers retract and the pairs of fingers 248 and 249 spring outwardly to contact the individual leads 214.

In each form of the unit shown and described, a component to be tested is held in a carrier against a plunger, which retracts to bring contact fingers into electrical contact with the component leads. The fingers are held in precise alignment and are protected against damage when not in use. Since only the resilience of the small fingers is used to apply contact pressure, the component is not distorted or damaged. The unit is readily adapted to a variety of components and carriers and is easily mounted in available test equipment.

Having described my invention, I now claim.

1. A contactor unit for electronic component testing comprising,
    a housing having an opening at one end and a cylindrical plunger slidably mounted therein,
    said plunger having a hollow axial socket and a first end projecting out said open end of the housing and the other end positioned in said housing,
    a plurality of resilient contact fingers positioned in said housing and having extended contact tips adjacent said first end of said plunger,
    said plunger having radial slots with ramp surfaces inclined inwardly toward the hollow axial socket of said plunger,
    said slots being open to said hollow axial socket,
    said fingers are mounted in said slots and bear against said ramp surfaces in radial and concentric alignment with the contact lead arrangement of a component to be tested in said axial socket,
    means for biasing said first end of said plunger between a retract position away from said housing opening and a contact position adjacent said housing opening,
    said plunger in said contact position moves said ramp surfaces axially inwardly in said housing moving said fingers radially inwardly making resilient pressure contact with the leads of a component in said hollow axial socket,
    and said ramp surfaces moving said fingers out of contact with the leads of a component when said plunger is in said retract position.

2. A contactor unit according to claim 1 wherein,
    said contact tips are flexible and flex when contacting said component leads prevent excessive pressure being applied by said contact tips to the component leads.

3. A contactor unit according to claim 2 wherein,
    said contact tips are freely suspended.

4. A contactor unit according to claim 2 wherein,
    said ramp surfaces contacting mid-portions of said fingers.

5. In contactor unit for electronic component testing as claimed in claim 2 in which,
    said biasing means comprises a resilient member positioned between the other end of said housing and said plunger,
    and stop means for limiting movement of said plunger toward said retractable position.

6. A contactor unit for electronic component testing as claimed in claim 1 including,
    stop means on said plunger and said housing for limiting the outward movement of said plunger.

7. A contactor unit according to claim 1 wherein,
    said fingers are arranged in pairs, the contact tips of each pair being longitudinally staggered to contact a common component lead at separated locations.

8. A contactor unit according to claim 1 wherein,
    said fingers are arranged in pairs, the fingers of each pair being convergent and having longitudinally staggered contact tips to engage a common component lead at separated locations.

* * * * *